3,047,577
PROCESS FOR THE PRODUCTION OF DYESTUFFS AND DYESTUFF INTERMEDIATES
Heinz-Werner Schwechten and Otto Bayer, both of Leverkusen-Bayerwerk, Germany, assignors to Farbenfabriken Bayer Aktiengesellschaft, Leverkusen, Germany, a corporation of Germany
No Drawing. Filed Apr. 8, 1959, Ser. No. 804,863
Claims priority, application Germany Apr. 28, 1958
11 Claims. (Cl. 260—276)

This invention relates to the production of dyestuffs and dyestuff intermediates of compounds containing ring systems.

It has been found that alkali metal cyanides can surprisingly and very smoothly be added to anthraquinone-acridones, anthrapyridones and the non-anthraquinonic quinones containing condensed ring systems, and that the addition products so obtained can be converted into the cyan derivatives by a treatment with oxidising agents.

Suitable compounds for the process according to the invention are, for example, anthraquinone-benzacridone and its substitution products such as e.g. the halo-, alkoxy-, phenyl- or alkyl substituted compounds, N-alkyl- or aryl-anthrapyridones, dibenzpyrenequinone, isodibenzpyrene-quinone, dibromo-dibenzpyrenequinone, anthanthrone, dibromo-anthanthrone, pyranthrone, violanthrone orisoviolanthrone and their substitution products such as e.g. the halides, e.g. chlorine or bromine or alkoxy derivatives. The alkyl groups contain preferably 1 to 5 C. atoms. The non-anthraquinonic quinones containing condensed ring systems contain for example 6 to 10 ring systems.

The reaction of the compounds used according to the invention with the alkali metal cyanides is carried out in inert solvents such as, e.g., polyhydric alcohols, amino-alcohols, formamide, alkyl formamides, preferably lower aliphatic glycols, at an elevated temperature, e.g. within a temperature range between 60 and 250° C. The alkali metal cyanides are thereby used in at least equivalent amounts referred to quinone, but preferably in an excess. The deep-coloured addition products often separate out in a good crystalline form after a very short time. Since they are, in general, sparingly water-soluble they can be separated by filtration after diluting the reaction mixture with water. The compounds thus obtained are leuco-alkali metal salts which can be converted by oxidation with conventional oxidizing agents, e.g. with hypochlorite or bichromate-acetic acid, into cyan derivatives of the initial compounds by methods known for the conversion of leuco vat dyestuffs into vat dyestuffs.

The cyan derivatives obtained according to the invention differ from the starting compounds by having a deeper colour. They are either vat dyestuffs or intermediate products for vat dyestuffs or pigment dyestuffs. By treatment with concentrated sulphuric acid they can be converted into the corresponding amides which, in general, are sparingly soluble and therefore especially suitable as pigment dyestuffs, and into the appropriate carboxylic acids.

The following examples are given for the purpose of illustrating the invention without limiting it thereto.

Example 1

12 g. of anthraquinone-2,1(N);1',2'(N)-benzene-acridone are heated to the boil with stirring for 5 minutes with 5 g. of potassium cyanide and 150 ml. of ethylene glycol. The melt becomes thick with formation of the dark brown-violet addition product. After cooling to 70° C. the melt is diluted with hot water, the reaction product filtered off with suction at 60° C. and washed with cold water until the filtrate shows a pale colour. The filter residue is pasted with water and oxidised at 70–80° C. with hypochlorite. The hot oxidation product is then filtered off with suction, washed with hot water, dried and recrystallised from boiling nitrobenzene; brown-red rhombs. Yield: 11.2 g.=86% of the theoretical.

Analysis of the cyan-anthraquinone-benzene acridone: Calculated, N 8.0%. Found, N 7.95%.

The colour of the vat is bright violet (the starting material dull red-violet).

When treated with 90% sulphuric acid at 40° C., the cyan derivative is converted into the carboxylic acid amide in a very short time. The barely soluble amide crystallises when boiled down with 20 parts of quinoline; a bluish-red, finely crystalline powder; colour of the vat a bright cherry red. Calculated, N, 7.61%. Found, N 7.39%, 7.48%.

Example 2

24 g. of anthraquinone-2,1(N);1',2'-(N)-naphthalene-acridone are heated to the boil for about 10 minutes while stirring with 20 g. of potassium cyanide in 300 cc. of ethylene glycol. The addition product crystallises in the form of dark brown-violet needles. When the starting material is no longer detectable in a sample on microscopic examination, the melt is worked up as described in Example 1. The cyananthraquinone-naphthalene-acridone thus obtained yields upon crystallisation from quinoline coarse brownish violet prisms, which are brown in transmitted light. Yield 23.2 g.=90% of the theoretical. The colour of the vat is a bright bluish violet (the starting material is violet-red). The colour of the solution in concentrated sulphuric acid is Bordeaux red (the starting material is orange).

Analysis of the cyan-anthraquinone-naphthalene-acridone: Calculated, N 7.0%. Found, N 6.75%.

Treatment with 90% sulphuric acid as described in Example 1, yields from the cyan derivative the corresponding carboxylic acid amide which crystallises in the form of small pink needles upon boiling down with quinoline in which it is barely soluble. The colour of the vat is cherry red. Calculated, N 6.70%. Found, N 6.70%.

The amide is convertible into the carboxylic acid by the action of nitrosyl-sulphuric acid in 90% sulphuric acid at room temperature, crystallising from nitrobenzene in the form of orange-red prisms.

Example 3

(a) 12 g. of 3',6'-dichloroanthraquinone-2,1(N);1',2'-(N)-benzene-acridone are heated to the boil on an oil bath while stirring with 10 g. of potassium cyanide in 200 cc. of ethylene glycol. The melt becomes very thick with the formation of a deep brownish violet paste of the addition product. When no further starting material is detectable, the melt is diluted with water at 70° C., the reaction product is filtered off with suction and washed with water until the filtrate is only very slightly coloured. The filter residue is then stirred with hot water and oxidised at 70–80° C. by the addition of 15 cc. of glacial acetic acid and 5 g. of sodium bichromate. When the oxidation is completed, the cyan derivative is filtered off with suction, washed with hot water and boiled down with nitrobenzene whereby it crystallises. Yield 11.2 g.=88% of the theoretical. The cyan derivative (N calculated 6.68%, N found 6.67%) crystallises from quinoline in the form of brownish violet prisms. The colour of the vat is a bright bluish violet.

The corresponding carboxylic acid amide obtainable as described in Example 1, crystallises upon boiling with quinoline in the form of yellow-brown small needles. Calculated, N 6.41%. Found, N 6.65%.

The colour of the vat is a bright red-violet. The carboxylic acid obtained therefrom as described in Example 1 crystallises from nitrobenzene in the form of long orange-red needles.

Further anthraquinone-benzene-acridones substituted in the benzene nucleus can be converted into the corresponding cyan derivatives according to the same method. Examples of compounds of this kind are as follows:

(b) 3′-phenyl-anthraquinone-benzene-acridone: The cyan derivative crystallises from nitrobenzene in the form of dark violet-blue needles. Yield 84% of the theoretical. Calculated, N 6.57%. Found, N 6.35%.

The colour of the vat is bright violet (the starting material is dull red-violet).

Cotton is dyed in reddish blue shades.

(c) 3′-phenoxy-4′,6′-dichloro-anthraquinone-benzene-acridone: The cyan derivative crystallises from nitrobenzene in the form of violet-brown leaflets. Yield 80% of the theoretical. N calculated 5.48%; N found 5.60%.

Cotton is dyed from a bluish violet vat in bright violet shades. Calculated, N 5.88%. Found N 5.95%.

The colour of the vat is a bright blue-violet. (The starting material is a dull red-violet.)

(d) 3′-methoxy-4′,6′-dimethyl-5′-chloro-benzene-acridone: The cyan derivative crystallises from nitrobenzene in the form of long bluish violet needles. Yield 92% of the theoretical. Calculated, N 6.33%. Found N 6.54%.

The colour of the vat is a bright violet (starting material a dull violet-red).

Example 4

12 g. of N-methyl-anthrapyridone are heated on an oil bath to 120–125° C. with 10 g. of potassium cyanide in 200 cc. of ethylene glycol; a brown solution is initially formed which soon goes over into a thick slurry of olive-brown small crystals. After some time these are transformed into olive-green needles, the melt again becoming thinner. After about 1 hour the transformation is completed. The melt is then diluted with cold water, the reaction product filtered off with suction and washed with cold water. The residue is stirred with hot water and heated to 80° C. after the addition of 15 cc. of glacial acetic acid and 5 g. of sodium bichromate until the product ceases to become brighter.

The cyan-N-methyl-anthrapyridone is then filtered off with suction, washed with hot water and dried. Yield 11.4 g. It crystallises from glacial acetic acid as felted yellow needles, from dimethyl formamide as long intense yellow needles. Calculated, 30 N 9.79%. Found N 9.85%.

The cyan-N-methyl-anthrapyridone is saponified to give essentially only the carboxylic acid amide even by heating to 170° C. with 85% sulphuric acid, which crystallises from a large quantity of 50% aqueous pyridine in the form of fine greenish yellow needles. Calculated, N 9.21%. Found, N 9.15%, 9.36%.

When instead of N-methyl-anthrapyridone, N-phenyl-anthrapyridone or N-(p-tolyl)-anthrapyridone are used, these compounds react with potassium cyanide in ethylene glycol already at 75–80° C. forming the addition products which crystallise in the form of olive-green fine needles. Upon working up, the corresponding cyan derivatives are obtained in about the same yield.

Example 5

12 g. of di-benzpyrene-quinone are heated to the boil while stirring with 10 g. of potassium cyanide in 150 cc. of ethylene glycol until the starting material has completely been transformed into the fine bluish violet needles of the addition product. The melt is then worked up as described in Example 3. Yield 12.6 g. of the crude product which upon crystallisation from aniline yields 10.3 g. of cyan-dibenzpyrene-quinone=80% of the theoretical in the form of yellow-brown needles. Calculated, N 3.92%. Found, N 3.86%, 3.95%.

The colour of the solution in concentrated sulphuric acid is a violet-red (dibenzpyrene-quinone is violet), the colour of the vat is a violet-red (dibenzpyrene-quinone is yellow-red).

The corresponding carboxylic acid amide is obtained in a pure state by heating the crude cyan derivative in 90% sulphuric acid to 40–50° C. for a few hours and working up the product separated by careful dilution with 70% sulphuric acid as described in Example 1; upon boiling with dimethyl formamide it crystallises in the form of barely soluble, orange-coloured fine needles. Calculated, N 3.73%, O 12.79%. Found N 3.63%, O 12.66%.

The colour of the vat is a cherry red, the dyeing on cotton yields a bright orange shade which is much more red than that of dibenzpyrene-quinone.

Example 6

20 g. of iso-dibenzpyrene-quinone are heated to 150° C. with 15 g. of potassium cyanide in 250 cc. of 1,4-butylene glycol until the red starting material has been completely transformed into the olive-coloured addition product. The melt, which has become very thick, is worked up as described in Example 3. Yield 20.6 g.=96% of the theoretical. The compound is violet red. Calculated, N 3.92%. Found, N 3.75%.

The colour of the vat is a Bordeaux red (isodibenzpyrene-quinone orange), the colour of the solution in concentrated sulphuric acid is green.

Example 7

15 g. of anthanthrone are heated with stirring to 140–150° C. with 12 g. of potassium cyanide in 180 cc. of ethylene glycol until no further starting material is detectable in a sample by microscopy occurring after about 15 minutes. The melt then forms a paste of fine dark crystals of the addition product which is worked up as described in Example 3. Yield 16 g. of a crude product which, upon recrystallisation from 10 parts of quinoline, yields 13.8 g.=86% of the theoretical of cyan-anthanthrone. Calculated, N 4.23%. Found, N 4.30%.

The colour of the solution in concentrated sulphuric acid is a dull bluish violet (of anthanthrone it is a bluish red).

The anthanthrone-carboxylic acid amide is obtained in a pure state by heating the crude cyan-anthanthrone in 90% sulphuric acid to 40–50° C. for a few hours, and then carefully diluting the sulphuric acid solution with a little water; upon crystallisation from quinoline it forms fine orange-red needles. Calculated, N 4.01%, O 13.74%. Found, N 4.17%, O 13.62%.

The colour of the solution in concentrated sulphuric acid is a dull bluish violet, the colour of the vat is violet.

Example 8

When using pyranthrone, it is advantageous to start from 2,2'-dimethyl-1,1'-dianthraquinonyl which is converted into pyranthrone upon alkaline treatment, and the process is carried out as follows:

20 g. of 2,2'-dimethyl-1,1'-dianthraquinonyl are heated with stirring in an oil bath to 180° C. with 15 g. of potassium cyanide in 250 cc. of 1,4-butylene glycol; the melt becomes very thick. After about 15 minutes the melt is briefly heated to the boil and then worked up as described in Example 3.

The yield of crude cyan-pyranthrone is nearly quantitative. Calculated, N 3.25%. Found, N 3.08%.

Cyan-pyranthrone dissolves in concentrated sulphuric acid with a greenish blue colour (pyranthrone with a blue colour) and vats with a violet (pyranthrone with a violet red) colour. It dyes cotton from a vat in an orange shade which is substantially redder than that obtained with pyranthrone.

Example 9

20 g. of violanthrone (finely powdered and screened) are heated to the boil for 30 minutes with 15 g. of potassium cyanide in 250 cc. of ethylene glycol. The melt is worked up as described in Example 3. The colour of the solution in concentrated sulphuric acid and of the vat of the product thus obtained in a yield of 19.6 g. do not differ very much from the colour of the starting material. Though it has a lower nitrogen content than that calculated for cyan-violanthrone, it dyes cotton from the vat in very dark navy blue shades of a substantially deeper blue than those obtained with violanthrone.

In a similar manner there is obtained from Bz-2,Bz-2'-dimethoxy-violanthrone a product which dyes cotton from a vat in more yellowish green shades than the starting material. Instead of violanthrone, isoviolanthrone may also be used accordingly.

We claim:

1. Process for the production of dyestuffs and dyestuff intermediates which comprises contacting at a temperature from about 60 to about 250° C. in an inert solvent an alkali metal cyanide with a member selected from one group consisting of anthraquinone-benzacridone, chloroanthraquinone-benzacridone, bromoanthraquinone-benzacridone, alkoxyanthraquinone-benzacridone, phenylanthraquinone-benzacridone, phenoxyanthraquinone-benzacridone, alkylanthraquinone-benzacridone, anthraquinone naphthalene-acridone, N-alkyl anthrapyridone, N-phenyl anthrapyridone, N-alkylphenyl anthrapyridone, dibenzpyrenequinone, isodibenzpyrenequinone, dibromo-dibenzpyrenequinone, anthanthrone, dibromo-anthanthrone, pyranthrone, violanthrone, chloro-violanthrone, bromo-violanthrone, isoviolanthrone, chloro-isoviolanthrone, bromo-isoviolanthrone, the alkyl and alkoxy groups having from 1 to 5 carbon atoms; oxidizing the leuco addition products thus obtained and recovering resultant cyano compounds.

2. Process for the production of dyestuffs and dyestuff intermediates which comprises contacting at a temperature from about 60 to 250° C. in an inert solvent an alkali metal cyanide with a member selected from the group consisting of anthraquinone-benzacridone, chloroanthraquinone-benzacridone, bromoanthraquinone-benzacridone, alkoxyanthraquinone-benzacridone, phenylanthraquinone-benzacridone, phenoxyanthraquinone-benzacridone, alkylanthraquinone-benzacridone, anthraquinone naphthalene-acridone, N-alkyl anthrapyridone, N-phenyl anthrapyridone, N-alkylphenyl anthrapyridone, dibenzpyrenequinone, isodibenzpyrenequinone, dibromo-dibenzpyrenequinone, anthanthrone, dibromo-anthanthrone, pyranthrone, violanthrone, chloro-violanthrone, bromo-violanthrone, isoviolanthrone, chloro-isoviolanthrone, bromo-isoviolanthrone, the alkyl and alkoxy groups having from 1 to 5 carbon atoms; oxidizing the leuco addition products thus obtained and saponifying resultant cyano groups.

3. The process of claim 1 wherein the inert solvent is a lower alkylene glycol.

4. A compound obtained according to the process of claim 1.

5. A compound obtained by contacting at a temperature from about 60 to about 250° C. in a lower alkylene glycol an alkali metal cyanide with a compound of the following formula

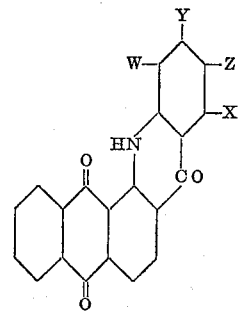

wherein W is a member selected from the group consisting of hydrogen, chlorine, phenyl, phenoxy and methoxy, X is a member selected from the group consisting of hydrogen, chlorine and methyl, Y is a member selected from the group consisting of hydrogen, chlorine and methyl and Z is a member selected from the group consisting of hydrogen and chlorine; and oxidizing the leuco addition product thus obtained.

6. A compound obtained by contacting at a temperature from about 60 to about 250° C. in a lower alkylene glycol an alkali metal cyanide with a compound of the following formula

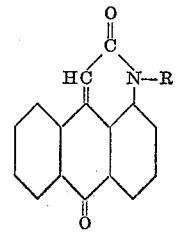

wherein R is a member selected from the group consisting of methyl, phenyl and methylphenyl; and oxidizing the leuco addition product thus obtained.

7. A compound obtained by contacting at a temperature from about 60 to about 250° C. in a lower alkylene glycol an alkali metal cyanide with a member selected from the group consisting of dibenzpyrenequinone and isodibenzpyrenequinone; and oxidizing the leuco addition product thus obtained.

8. A compound obtained by contacting at a temperature from about 60 to about 250° C. in a lower alkylene glycol an alkali metal cyanide with a member selected from the group consisting of anthanthrone and pyranthrone; and oxidizing the leuco addition product thus obtained.

9. A compound obtained by contacting at a temperature from about 60 to about 250° C. in a lower alkylene glycol an alkali metal cyanide with a member selected from the group consisting of violanthrone and Bz-2,Bz-2'-dimethoxy-violanthrone; and oxidizing the leuco addition product thus obtained.

10. A compound obtained by contacting at a temperature from about 60 to about 250° C. in a lower alkylene glycol an alkali metal cyanide with anthraquinone-2,1(N),1',2'-(N)-naphthaleneacridone; and oxidizing the leuco addition product thus obtained.

11. A compound of claim 5 wherein W and X are each chlorine and Y and Z are each hydrogen.

References Cited in the file of this patent

UNITED STATES PATENTS

| | | |
|---|---|---|
| 2,163,950 | Koeberle | June 27, 1939 |
| 2,698,337 | Heider et al. | Dec. 28, 1954 |

FOREIGN PATENTS

| | | |
|---|---|---|
| 761,685 | France | Jan. 10, 1934 |
| 484,663 | Germany | Oct. 24, 1929 |

OTHER REFERENCES

Ullman et al.: "Beilstein's Handbuch," first supp., 4th ed., vol. 10, p. 403 (1932).